United States Patent
Zhang et al.

(10) Patent No.: US 7,400,589 B2
(45) Date of Patent: Jul. 15, 2008

(54) METHOD AND APPARATUS FOR DERIVING OPTIMAL PATHS THROUGH A NETWORK SUBJECT TO A SUBSET SEQUENCE CONSTRAINT

(75) Inventors: Hong Zhang, Kanata (CA); Ravi Ravindran, Ottawa (CA); Peter Ashwood Smith, Hull (CA); Guo Qiang Wang, Kanata (CA)

(73) Assignee: Nortel Networks Limited, Ottawa, Ontario (CA)

( * ) Notice: Subject to any disclaimer, the term of this patent is extended or adjusted under 35 U.S.C. 154(b) by 875 days.

(21) Appl. No.: 10/787,107

(22) Filed: Feb. 27, 2004

(65) Prior Publication Data

US 2005/0190704 A1    Sep. 1, 2005

(51) Int. Cl.
*H04L 12/28* (2006.01)
(52) U.S. Cl. ...................................... 370/254
(58) Field of Classification Search ................ 370/254, 370/255, 351; 379/114.02; 701/202, 209
See application file for complete search history.

(56) References Cited

U.S. PATENT DOCUMENTS

| | | | |
|---|---|---|---|
| 6,044,075 A | 3/2000 | Le Boudec et al. | 370/351 |
| 6,195,553 B1 | 2/2001 | Claffery et al. | 455/445 |
| 2002/0059025 A1* | 5/2002 | Kim et al. | 701/209 |

* cited by examiner

*Primary Examiner*—Chirag G Shah
*Assistant Examiner*—Yong Zhou
(74) *Attorney, Agent, or Firm*—Ogilvy Renault LLP

(57) ABSTRACT

A routing tree that spans a graph representing a network is constructed by iteratively expanding the tree to include a node of the graph that is not in the tree, the node being chosen because an allowable path extends from a root of the tree to the node that is optimal in comparison with the other paths to the other nodes not in the tree. If the path to the node cannot be extended to a node in the serial restriction group, the node is re-included in the tree using a secondary path to the node that can be extended to a node in the serial restriction group, if the secondary path is most optimal among the paths to nodes outside of the tree.

21 Claims, 3 Drawing Sheets

METHOD AND APPARATUS FOR DERIVING OPTIMAL PATHS THROUGH A NETWORK SUBJECT TO A SUBSET SEQUENCE CONSTRAINT

CROSS-REFERENCE TO RELATED APPLICATIONS

This is the first application filed for the present invention.

MICROFICHE APPENDIX

Not Applicable.

TECHNICAL FIELD

The invention generally relates to procedures for determining a least cost path through a network, and, in particular, to a method and apparatus for deriving optimal paths in a network subject to a subset sequence constraint.

BACKGROUND OF THE INVENTION

Data networks are formed of a number of network elements (NEs) interconnected by links. The links interconnecting the NEs may form a pattern corresponding to one of a number of known topologies, such as ring, star, linear, and full mesh topologies. A class of topologies called mesh networks is a generalization of these topologies and is associated with no restrictions on links (except that every NE is directly or indirectly interconnected to every other NE via some number of links and intermediate (NEs). It is further commonplace in today's networks to find different autonomously managed networks bridged to each other at various gateways and for data transport services to be provided across the networks in a manner that is transparent to users.

Typically, core networks are fed by edge networks, the core network serving to interconnect disparate edge networks, and generally providing longer haul data transport. In recent years for numerous reasons, including security, privacy, scalability, and simplicity, core network providers have recognized a value for presenting abstracted representations of their topologies to edge network NEs. Frequently the core network is abstracted to represent a full mesh network (where each abstracted NE is linked to each other abstracted NE). Such an abstracted network typically includes only the NEs relevant to the edge network, which may be every core NE that is linked to an edge network NE, or a subset of those core NEs.

As noted, one of the reasons for presenting the abstracted view of the core network is that many complicated details of allowable routes and network availability are simplified. For example, many core networks have a ring topology, such as a synchronous optical network (SONET) ring, and many of these rings networks impose timeslot continuity restrictions on allowable paths. Timeslot continuity is a requirement that traffic conveyed over successive links of the ring must occupy the same timeslot on successive links. Where timeslot continuity is not available, traffic cannot be routed through the adjacent links in sequence, even though each link, taken alone, has sufficient capacity to carry the traffic. Such a problem introduces a constraint in computing paths through the abstracted core, because it is possible that capacity is available over a route AB between A and B and a route BC between B and C, but traffic cannot transit AB and then BC in sequence. Such a constraint is termed "subnetwork intransitivity", because transitivity (a well known mathematical property of relations asserting that for any A,B,C, if A is related to B, and B is related to C, then A is related to C) of the network fails if each of routes AB and BC are individually allowable but path ABC (traversing routes AB and BC in sequence) is not allowable, in the same subnetwork.

Similar subnetwork intransitivity is encountered in passive optical networks where wavelength continuity is required. In passive optical networks no optical fiber link of the passive optical network can transport traffic on two channels at the same wavelength. Accordingly a wavelength channel may be available on a first optical fiber link, and a second wavelength channel may be available on a second link, but it is not possible to transmit a signal over the two links in sequence.

A third example of subnetwork intransitivity is found in core networks that do not require wavelength or timeslot continuity, but have abstracted views that are updated in response to changes in availability of the actual resources of the network. Generally in such networks a change in availability (e.g. caused by signal failures, a threshold of occupancy is exceeded, etc.) is signaled by a tandem NE within the core network using a flooding process well known in the art. This method is effective for delivering the change of availability information to an edge networks, but it does not guarantee that the information received by the edge network is either consistent or timely. It can take a second between receiving a first update and receiving consistent information regarding the network. In the interim an apparently allowable route may be tried unsuccessfully many times. Each unsuccessful attempt uses NE processor time, and congests network control signaling channels to no avail. This problem is referred to as "buzzing".

In the first example of subnetwork intransitivity (timeslot continuity), an allowable path may be obtained by exiting the subnetwork and returning to it. For example, traffic may leave the ring and re-enter on a different timeslot to obtain an allowable path, because timeslot continuity is only required between successive links within the ring itself. Following the above example, in which routes AB and BC are individually allowable but path ABC (that is, routes AB and BC in sequence) is not allowable, path ABDBC (traversing routes AB, BD, DB, BC in sequence) would be an allowable path, provided that routes BD and DB have available bandwidth and D is not in the subnetwork. Similarly, if leaving the passive optical network core involves receiving the optical channel and reemitting the signal at another wavelength, the excursion from the core network may make the path allowable.

However, the third example (and the second example where reception of the optical channel is not an option) are examples of a stronger constraint on acceptable routes in the network. Broadly stated, the "stronger constraint" refers to a case where, for example, a path that traverses route AB cannot allowably be extended through route BC, even with a detour through a node D that is not part of the subnetwork. Thus, the "stronger constraint" would mean that neither or paths ABC or ABDBC would be allowable, because the path traverses route AB, and so cannot be extended through route BC, even with the intermediate detour through routes BD and DB. One method for solving subnetwork intransitivity is taught in copending, co-assigned U.S. patent application Ser. No. 10/691,517, entitled METHOD AND APPARATUS FOR DERIVING ALLOWABLE PATHS THROUGH A NETWORK WITH INTRANSITIVITY CONSTRAINTS which was filed on Oct. 24, 2003 and is incorporated herein by reference. Both subnetwork intransitivity and the stronger constraint give rise to what are termed "subset sequence constraints".

While numerous methods for computing routes using variants of Dijkstra's algorithm, artificial intelligence applications, and linear programming methods, are known, none of these methods provides paths that are guaranteed to be optimal allowable paths, and none of these accounts for subset sequence constraints.

There therefore exists a need for a method and apparatus for computing optimal paths subject to a subset sequence constraint.

SUMMARY OF THE INVENTION

It is therefore an object of the invention to provide method and apparatus for computing optimal paths subject to a subset sequence constraint.

In accordance with an aspect of the invention, a method is provided for computing an optimal route between a first network element (NE) and other NEs of a network using a weighted graph of interconnected nodes that represent the network. The optimal route is computed subject to a subset sequence constraint associated with a serial restriction group in the weighted graph. The method involves creating a list of temporary labels respectively associated with the nodes of the graph. Each node is assigned a primary label: and each node in the serial restriction group is additionally associated with a backup label. The list initially includes a primary label of a root node that represents the first NE that has a most optimal optimization parameter.

Once the list is formed, the method continues by examining the list of temporary labels to identify a most optimal label. The identified label is made permanent and removed from the list. Once a label is made permanent the method continues by selectively updating primary and backup labels in the list. For every node adjacent the permanently labeled node that has a primary label in the list, the primary label is selectively updated to ensure that the primary label identifies an optimal allowable path from the root node to the adjacent node. For every node adjacent the permanently labeled node that has a backup label in the list, the backup label is selectively updated to ensure that the backup label identifies an optimal allowable path from the root node to the adjacent node. The steps of identifying and removing labels, and of updating the adjacent nodes are repeated until all primary labels of nodes representing the other NEs are permanent.

The optimization parameter is preferably a cost and is minimized.

Selectively updating the backup labels preferably involves ensuring that a backup label of the adjacent node is initialized unless the primary label path of the adjacent node cannot be allowably extended to a node in the serial restriction group, in accordance with the subset sequence constraint. Specifically, selectively updating the backup labels may further involve setting a restriction flag at the adjacent node and saving a previous primary label as the backup label when the primary label is updated to identify a path that is not allowably extended to another node in the serial restriction group. In this case, the method further involves unsetting the restriction flag at the adjacent node and reinitializing the backup label of the adjacent node if the primary label of the adjacent node is subsequently updated to identify a path that is allowably extended to another node in the serial restriction group.

The selectively updating the primary label further comprises determining whether a path of the permanently labeled node extended to the adjacent node is allowable by the subset sequence constraint using at least one of: a rule for inclusion of members in the subgroup; and a list identifying allowable sequences of nodes. Specifically, the subset sequence constraint may be subset intransitivity, in which case determining whether the path is allowable involves determining that the path of the permanently labeled node extended to the adjacent node is not allowable, if the adjacent node is in the serial restriction group, and a restriction flag is set at the permanently labeled node. If the subset sequence constraint includes a subset seriality restriction, which precludes paths that include two links between three nodes in the serial restriction group, the determining whether the path is allowable involves determining that a path of permanently labeled node extended to the adjacent node is not allowable if the adjacent node is in the path of permanently labeled node. The paths may be subject to a plurality of independent subset sequence constraints, associated with respective disjoint serial restriction groups.

In accordance with a second aspect of the invention, a method for deriving an optimal route from a first network element (NE) in a network to other NEs in the network, wherein the route is subject to a subset sequence constraint, is provided. The method involves obtaining a weighted graph representing the network. The graph is a set of nodes and edges, the nodes representing NEs in the network. A subset of the nodes are identified as members of a serial restriction group. The method then involves constructing a spanning tree over the graph rooted at a root node which represents the first NE. Constructing the spanning tree involves iteratively expanding the tree to include a node to which a path from the root node is allowable in accordance with the subset sequence constraint, and is most optimal among the paths to nodes outside of the tree, and if the path to the node cannot be extended to a node in the serial restriction group, reincluding the node through a secondary path to the node that can be extended to a node in the serial restriction group, when the secondary path is most optimal among the paths to nodes outside of the tree.

The including a node in the tree preferably involves making permanent a primary or a backup label of the node and updating temporary labels of nodes adjacent to the permanently labeled node. The iteratively expanding preferably involves choosing the node that is most optimal from among the temporary labels.

Updating temporary labels involves ensuring that a primary label of the node identifies an optimal allowable path from the root node to the labeled node, and if the identified path to the node is not allowably extended to a node in the serial restriction group, ensuring that a backup label of the node identifies an optimal allowable path from the root node to the labeled node that is allowably extended to a node in the serial restriction group. Re-including a node comprises making permanent a temporary backup label.

In accordance with another aspect of the invention, there is provided a route selection processor adapted to use a weighted graph representing a network of network elements (NEs) to identify an optimal route from a first network element (NE) of the network, to other NEs of the network, subject to a subset sequence constraint. The route selection processor is adapted to construct a spanning tree over the graph rooted at a root node representing the first NE by: iteratively expanding the tree to include a node of the graph to which a path from the root node is allowable, in accordance with the subset sequence constraint, and is most optimal among the paths to nodes outside of the tree; and if the path to the node cannot be extended to a node in a serial restriction group that includes some of the nodes in the graph, re-including the node through a secondary path to the node that can be extended to a node in the serial restriction group, when the secondary path is most optimal among the paths to nodes outside of the tree.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The invention provides a method of deriving an optimal allowable route through a network of network elements (NEs) interconnected by links, where the allowable route through the network are subject to a subset sequence constraint that forbids certain sequences of NEs (or their links) with respect to membership of the NEs in a serial restriction group. The method permits optimized routing across networks that have intransitive serial restriction groups, such as networks having abstracted subnetworks, and other restrictions.

Figure 1:
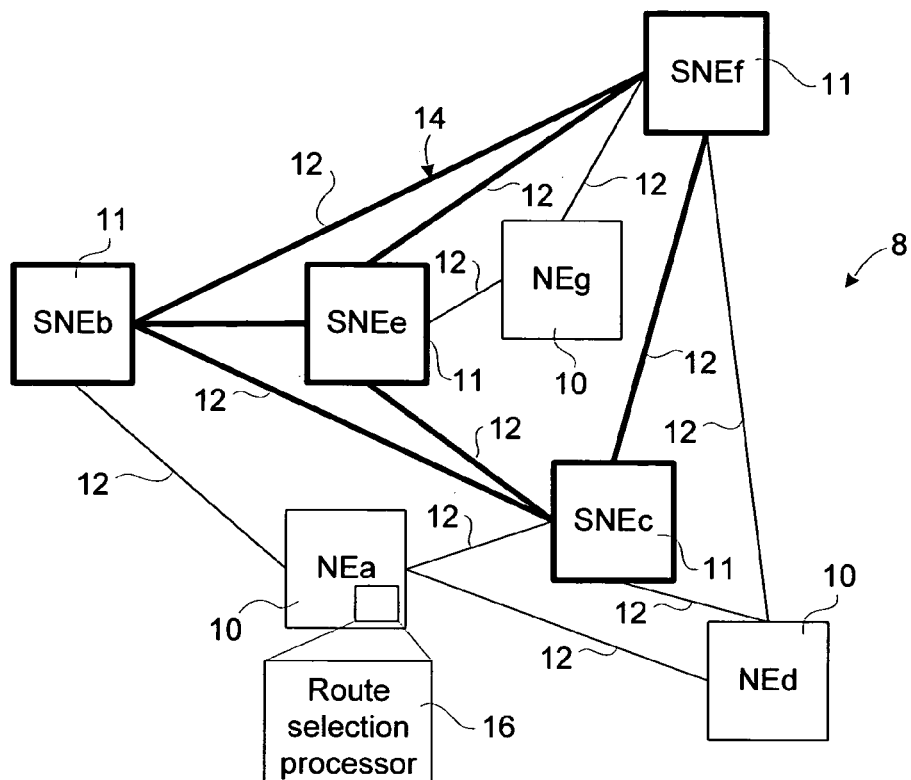
FIG. 1 is a schematic diagram representing a mesh connected network that includes a subnetwork.

FIG. 1 schematically illustrates a network 8 of network elements 10 (NEs), including subnetwork elements SNEs 11 interconnected by links 12. Respective NEs 10 and SNEs 11 are identified as NEa, SNEb, ... NEg. The network 8 includes a subnetwork 14 encompassing SNEb, SNEc, SNEe, and SNEf, and six links 12 interconnecting these four, which have of darker line weight for easy identification. It will be recognized by those of skill in the art that the subnetwork is a completely interconnected (i.e. full mesh) subnetwork.

As stated above, routing constraints and continuity conditions of subnetwork 14 impose limitations on allowable paths that pass through the subnetwork 14, and, in particular, introduce a subset sequence constraint (i.e. a limitation on allowable paths through a network that depends on a sequence of SNEs 11 in the subnetwork 14). The subnetwork 14 may not correspond directly to the topology of an underlying physical subnetwork, for various reasons. A method for computing metric information on such subnetworks is described in co-pending, co-assigned U.S. patent application Ser. No. 10/718, 681 entitled METHOD AND APPARATUS FOR COMPUTING METRIC INFORMATION FOR ABSTRACTED NETWORK LINKS, filed on Nov. 24, 2003 which is incorporated herein by reference.

A route selection processor 16 is shown residing in a NEa 10 of the network 8. The route selection processor 16 includes hardware and software for executing a process in accordance with the invention. The route selection processor 16 could also be located at any other location in the network 8, or a network management system known in the art.

Figure 2:
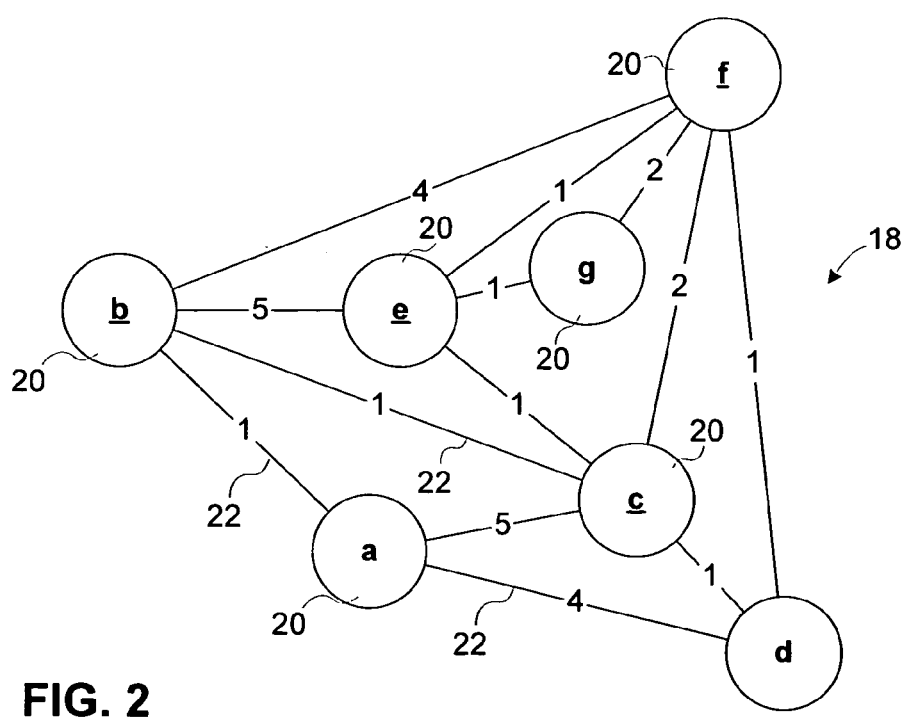
FIG. 2 is a schematic diagram illustrating a weighted graph representing the network shown in FIG. 1.

FIG. 2 is a schematic diagram of an undirected graph 18 that represents the network shown in FIG. 1. The graph 18 is used for computing paths through the network 8. All of the NEs 10/SNEs 11 and links 12 that are represented (by corresponding nodes 20, and edges 22) have capacity available to transport traffic at a predefined rate. Each NE 10/SNE 11 is represented by a node 20 (or vertex), and each link 12 is represented by a corresponding edge 22 (only 3 of which are labeled). In the description that follows, particular nodes are identified by their labeled letter (e.g. node c, node d), and edges are identified by the labeled letters of the two nodes connected to the edge in either order (e.g. edge ge). Likewise a path through the graph 18 is a sequence of labeled letters where each adjacent pair of letters corresponds to an edge of the graph. An adjacent node to a node n is a node m for which an edge nm exists.

The nodes 20 that represent NEs of the subnetwork 14, are underlined to indicate membership in a serial restriction group. The serial restriction group is defined as a subset of the nodes 20 (i.e. {b,c,e,f}) that are used to identify paths that are not allowable because of a subset constraint.

Several examples of subset sequence constraints are encountered on data transport networks having a subnetwork 14 as described above. A first constraint is called subset intransitivity. The restriction imposed by subset intransitivity is that no path may include two consecutive edges between three nodes in the serial restriction group. To make this limitation more clear, consider the graph 18 shown in FIG. 2, the serial restriction group b,c,e,f contains 6 edges 22: bc, be, bf, ce, cf, and ef. According to the subset intransitivity, the paths abce, bcf, bcbadcare not allowable; whereas bace, abcda, bcd ce, and bcadce are allowable. It will be noted that paths that fail this rule conspicuously include three consecutive members of the serial restriction group.

As used herein, a first and a second node are "sequential" or "in sequence" in a path if the first appears before the second. Non-adjacent nodes in a path may be said to be sequential with respect to an order of the nodes. Similarly edges ab, and bc are said to be sequential in a path if ab and bc are included in the path, and ab appears (not necessarily directly) before bc.

There are stronger restrictions that may also be imposed on allowable routes in data transport networks. For example, in accordance with another, stronger, subset sequence constraint, no two adjacent subnetwork links may be a part of the path, in sequence, though not necessarily consecutively. In other words, if x,y,z are in the same subnetwork, a path that contains xy and then later yz, is not allowable. Because optional routing naturally precludes self intersecting (looping) paths, the stronger constraint is effectively equally well expressed as follows: no path can contain xy and yz, because any path containing yz . . . xy is looped. According to this subset sequence constraint the following are not allowable paths: abce, bcdce, ecdfbacf, bcadce; whereas abcdf, ecdfb, cbacf (although this path may not be chosen by any optional routing algorithm because of the loop at node c) are allowable.

A still stronger subset sequence constraint that can be accommodated using a variant of the method described below, is a restriction that no two links between any members of a serial restriction group can be included in a path. In other words, no path may include three consecutive nodes in the serial restriction group, or any two pair of consecutive nodes in the serial restriction group. Other restrictions can also be enforced by a rule or an explicit list of allowable paths, if required. A clear rule for determining which paths are allowed, and which are allowably extended to another node in the serial restriction group, are required by the procedure described below, and in order to ensure optimality, the process requires that the subset sequence constraint is monotonic (any extension of a path through the graph is not allowable, if the path itself is not allowable), and that allowability is not dependent on more than a two nodes in the path. Of course the invention can be adapted to handle more intricate constraints.

Figure 3:
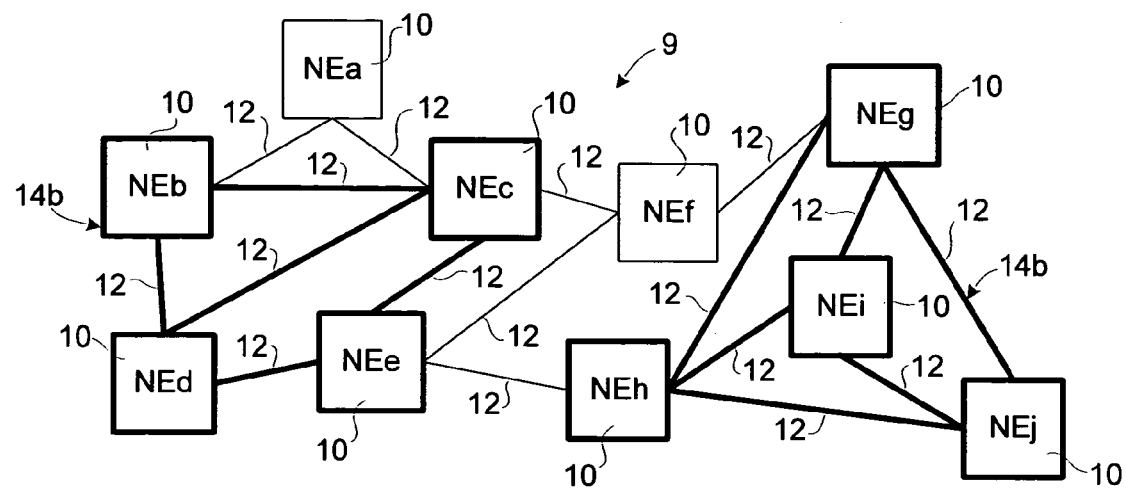
FIG. 3 is a schematic representing a second mesh connected network that includes two subnetworks.

FIG. 3 schematically illustrates a second network 9 for use in illustrating the invention. Network 9 includes two subnetworks 14a,b, a first of which (14a) includes NEb, NEc, NEd, and NEe, and five links 12 interconnecting these four to each other, and a second subnetwork 14b including NEg, NEh, NEi, and NEj, and the corresponding six links 12. The first subnetwork 14a is full mesh connected save one link between NEb and NEe, and the second subnetwork 14b is full mesh connected. The elements of the subnetworks 14a,b are shown with a darker line weight for easy identification.

Figure 4:
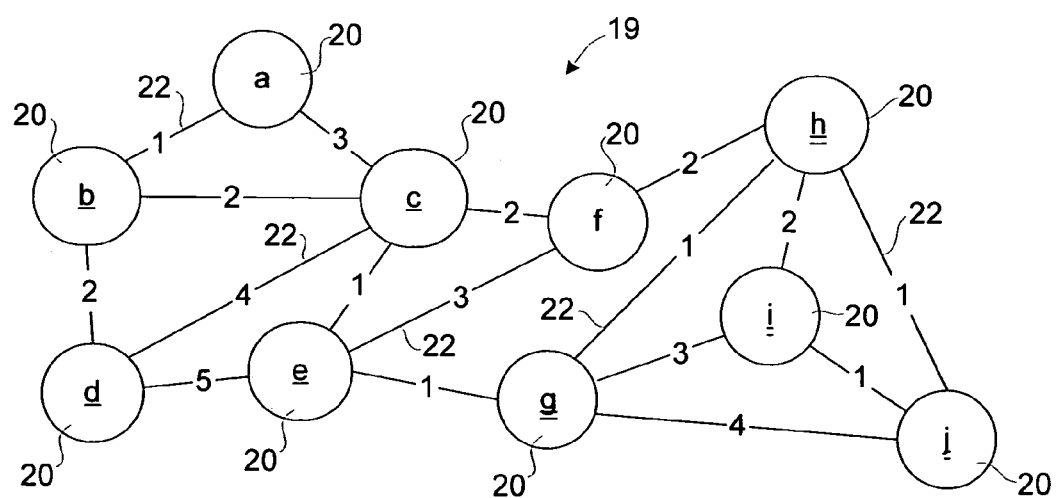
FIG. 4 is a schematic diagram illustrating a weighted graph representing the network shown in FIG. 3.

FIG. 4 schematically illustrates a graph 19 representing the network illustrated in FIG. 3, with edge weights likewise assigned. The graph 19 includes nodes b,c,d,e in a first serial restriction group associated with the first subnetwork 14a, and nodes g,h,i,j which are in a second serial restriction group associated with the second subnetwork 14b.

The invention provides a method for determining an optimal route through a network that is allowable in accordance with any subset sequence-constraint in the path. The method is generally modeled after the well-known Dijkstra's algorithm, which identifies least-cost paths to all of the nodes from a given root node for a positively weighted graph. Effectively, Dijkstra's algorithm constructs a tree rooted at the root node that spans a weighted graph. The tree is constructed by iteratively expanding the tree to include a node for which a path from the root to the node is optimal among the paths to nodes not in the tree. Optimality is determined with respect to an optimization parameter computed using weights of the edges of the graph. The optimization parameter is typically computed as a sum of the (additive) weights of the edges in the path, although it may be a minimum or maximum of a (convex) weight of the edges in the path, or may be computed otherwise. Hereinafter the optimization parameter will be assumed to be a "cost", wherein the weights are additive and lower costs are more optimal. The weight of the edges is associated with metric information relating to resource availability in the network.

Procedurally, Dijkstra's algorithm starts with a permanently labeled root node (which is assigned a path containing only an identifier of the root node, and a null cost), and for every node adjacent to the root node, a weight of an edge connecting the root node to the adjacent node is used to assign a temporary label to the adjacent node. The label includes the path of the root node extended to the adjacent node, and a cost associated with the label is a sum of the weight of the edge and a cost of the path of the root node. The temporary label with the least cost is then selected and made permanent. All of the temporarily labeled nodes adjacent to the node that is permanently labeled are updated to ensure that the path to the temporary labeled node is optimal. That is, if a sum of the cost associated with the permanently labeled node and the weight of an edge between the permanently labeled node and an adjacent node has a lower cost than a cost associated with the adjacent node's current temporary label, a lower cost path between the root node and the node adjacent to the most recently permanently labeled node is available. Accordingly, the current temporary label of the adjacent node is replaced with a label identifying a path that is equal in cost to the path identified by the permanent label with the adjacent node appended thereto. The procedure is then reiterated to select and make permanent a temporary label having a least cost. Once all of the nodes are permanently labeled, least cost paths are identified by each label. Making the labels permanent is the way in which the tree is iteratively expanded to include nodes in the graph, until all of the nodes are permanently labeled.

In accordance with the invention, the subset sequence constraints on allowable paths are compensated for by precluding the temporary labeling of paths that are not allowable, and adding backup labels for each node that may potentially have different primary and secondary optimal paths. A primary path is a least cost path to the node. A secondary path is a least cost path to the node that can be extended to any other adjacent node, given a subset sequence constraint. In accordance with the present embodiment, a serial restriction group is defined to facilitate identification of allowable paths and paths that are allowed to be extended. Additionally, a restriction flag for each serial restriction group can be set at any node in the serial restriction group, to expedite the process. Nodes that are not in a serial restriction group, do not require backup labels or restriction flags. The method provides the backup labels so that if a least cost path to a node in the serial restriction group is allowable, but cannot be extended to another node in the serial restriction group, a backup label is stored that identifies a higher cost path that can be extended to a node in the serial restriction group. The backup labels permit the re-inclusion of nodes in the tree via a secondary path that can be extended to another node in the serial restriction group.

The method described with reference to FIG. 5 compensates for the subset sequence constraint on allowable paths, so that no two adjacent subnetwork links are a part of the path in sequential order, and to compensate for subset intransitivity.

Figure 5:
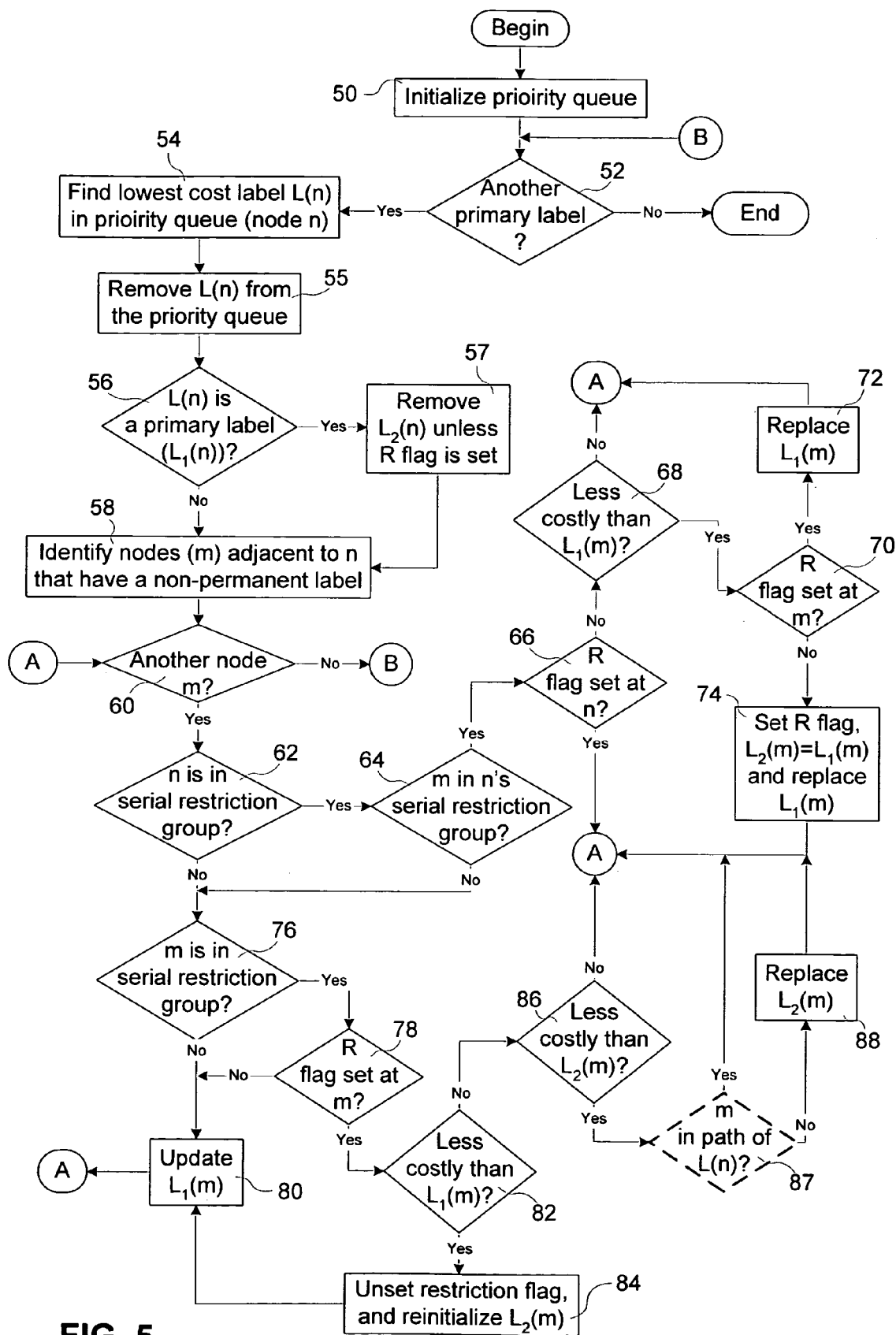
FIG. 5 is a flow chart illustrating principal steps involved in computing least cost paths through a weighted graph.

FIG. 5 is a flow chart illustrating principal steps in a procedure for deriving least cost allowable paths through a graph of a network of arbitrary topology. The method begins when a weighted graph representing the network is defined, and a priority queue containing all of the nodes is initialized (step 50). On initialization, all of the primary labels of the nodes (except a root node) are assigned an effective weight of infinity and the paths are set to null. In practice, an initial weight greater than any path through the network suffices. Each node in a serial restriction group is supplied with both primary and backup labels, and has a corresponding restriction flag that is initially unset. Further a root node, which represents the NE from which the routes are computed, has a label that is given an optimal cost of 0, and a path description that only contains an identifier of the root node. It is determined, in step 52, whether all of the nodes are permanently labeled (and only backup labels remain in the priority queue). In accordance with an alternative embodiment of the invention, the procedure ends when only a predefined subset of the nodes are permanently labeled. A node is permanently labeled when a primary label of the node is made permanent. It may be inferred that a node is permanently labeled if the primary label of the node is not in the priority queue. If the priority queue contains only backup labels, all of the nodes have been permanently labeled. When there are no more impermanent primary labels, the procedure ends. Otherwise a node n having a least cost temporary label L(n) in the priority queue is selected (step 54) to be included in a tree of least cost paths in the graph from the root node.

As label L(n) is a least cost (i.e. optimal) label in the priority queue, and the weights of the edges are non-negative, no path in the graph from the root node to node n is of a lower cost. Accordingly label L(n) is removed from the priority queue, and node n is permanently labeled (step 55). If label L(n) is a primary label (determined in step 56), the backup label ($L_2(n)$) of node n is also removed from the priority queue, unless a restriction flag is set at node n (step 57). Each node m adjacent to node n that has a temporary (or initialized) label, is identified in step 58. The label(s) of each node m may or may not be updated, depending on the membership of node m in a serial restriction group, and whether a restriction flag is set at node n, as is further described below. If there are no (more) nodes m identified (step 60), the procedure returns to step 52.

Otherwise, a node m is identified, and it is determined (step 62) whether node n is a member of a serial restriction group. If so, it is determined (step 64) whether node m is a member of the same serial restriction group as node n. If node m and node n are not in the same serial restriction group, the procedure advances to step 76. Otherwise it is determined (in step 66) if the restriction flag (R flag) is set at node n. If the restriction flag is set at node n, a node prior to node n in the path identified by L(n) is examined to determine if it is also in the same serial restriction group as node n. If so, the path cannot allowably be extended to node m or any other member of the serial restriction group. The labels of node m are not updated, and the procedure returns to step 60.

If a restriction flag is not set at node n, but node m and node n are in the same serial restriction group, the new path to node m (via node n) is allowable, but is not allowably extended to another node in the serial restriction group. Accordingly, it is determined (step 68) whether a new path identified by the label L(n) extended to node m is less costly than the cost of a path identified by $L_1(m)$. More specifically, it is determined if a sum of the cost of the path identified by the label L(n) plus the weight of nm is less than a cost of a path identified by the label $L_1(m)$. Because node n and node m are in the same serial restriction group, the new path cannot update a backup label, which as the backup label identifies a least cost path to node m that can be extended to a node in the serial restriction group. Accordingly, if the new path is not of a lower cost than the path identified by the label $L_1(m)$, the procedure returns to step 60 without altering any labels of node m. It will be noted that if node m is permanently labeled, it was selected in step 58 because its backup label is temporary and no backup label could be updated. While the cost of the path identified by the label $L_1(m)$ could not exceed that of the new path and consequently the labels at node m would not be updated, it will be appreciated by those skilled in the art that a comparison of two numbers is computationally more expensive than checking a Boolean value. Accordingly, it may be preferable to determine whether node m is permanently labeled prior to performing the comparison in step 68, so that the comparison is avoided if node m is permanently labeled.

If the new path is of a lower cost than the path identified by the label $L_1(m)$, it is determined in step 70, whether a restriction flag is set at node m. If the restriction flag is set at node m, the label $L_1(m)$ is replaced by a label that indicates a path that is the new path through node n, and its associated cost (step 72) and the restriction flag remains set. Otherwise, the restriction flag is set at node m, the primary label of node m is copied to the backup label (as a path of the former primary label is either allowably extended to a node in the serial restriction group, or initialized and contains no path), and content of the primary label is replaced with the new path and its cost (step 74). In either case the procedure returns to step 60.

If node n and node m are not in a same serial restriction group, (as determined in steps 62,64), the new path extended from node n to node m is allowable, and allowably extended. It is determined (step 76) whether node m is in a serial restriction group, and (step 78) whether a restriction flag is set at node m. If node m is not in a serial restriction group, or a restriction flag is not set at node m, label $L_1(m)$ is initialized or temporarily labeled by a path that is allowably extended, and the procedure updates the label $L_1(m)$ in step 80, and returns to step 60. Updating, in the present context involves conditionally replacing a current value of the label $L_1(m)$. Specifically, if the cost associated with the label L(n)+the weight of nm, is less than a cost of a path identified by the label $L_1(m)$, the label $L_1(m)$ is replaced with a label having the path of the label L(n) with node m appended, and a cost equal to the cost of the label L(n)+the weight of nm. Otherwise updating does not involve changing the labels at node m.

If a restriction flag is set at node m, it is determined (in step 86) whether the new path is less costly than that identified by the label $L_1(m)$. It will be noted again that if label $L_1(m)$ is permanent, the new path cannot have a lower cost, and this may be determined prior to the comparison in step 86. If the new path is of a lower cost, the restriction flag at node m is unset, the label $L_2(m)$ is reinitialized (step 84), and the procedure advances to step 80, where the label $L_1(m)$ is replaced with a label that identifies a lower cost new path through node n. If the new path is not less costly than the one identified by the label $L_1(m)$, it is determined (step 86) whether the new path is less costly than the path identified by the label $L_2(m)$. If the new path is found to be at least as costly as the one identified by the label $L_2(m)$, the procedure returns to step 60 without updating any label of node m. On the other hand, if the new path is less costly than a current secondary path to node m, (the path identified by the label $L_2(m)$), one of two procedures for changing the label $L_2(m)$ is applied, in dependence on whether the subset sequence constraint is subset intransitivity or a stronger constraint. If the process only compensates for subset intransitivity, the procedure advances to step 88 wherein the label $L_2(m)$ is replaced with a label identifying the new path, and having the corresponding lower cost, before the procedure returns to step 60. If the process compensates for the stronger subset sequence constraint, the procedure advances to step 87 in which it is determined whether the path identified by the label L(n) contains node m. If node m is in the path to node n, the procedure precludes the updating of the secondary path to node m, and in this way avoids a looping path. If node m is determined not to be in the path to node n, the procedure advances to step 88.

Two examples of the method described above are presented. Assuming the root node is node a of FIG. 2, the procedure begins by assigning a weight of 0 to label $L_1(a)$, and a path of {a}. The node a is then permanently labeled and label $L_1(a)$ is removed from the priority queue. After the procedure completes processing of a, the adjacent nodes are respectively labeled; i.e., $L_1(\underline{b})=(1, \{a\underline{b}\})$, $L_1(\underline{c})=(5, \{a\underline{c}\})$, and $L_1(d)=(4,\{ad\})$. The processing of a is now complete, and of the labels in the priority queue, label $L_1(\underline{b})$ has a lowest cost (1).

Accordingly, the label $L_1(\underline{b})$ is made permanent and processed next. As node $\underline{b}$ is in the serial restriction group, it has a backup label that happens to be initialized. Because the restriction flag is not set at node $\underline{b}$, the backup label is removed from the priority queue. The labels of nodes adjacent to node $\underline{b}$ include $\underline{c},\underline{e},\underline{f}$, and the already permanent node a. Accordingly, $\underline{c},\underline{e},\underline{f}$, are labeled as $L_1(\underline{c})=(2, \{a\underline{bc}\})$, $L_1(\underline{e})=(6, \{a\underline{be}\})$, and $L_1(\underline{f})=(5, \{a\underline{bf}\})$, respectively. Because node $\underline{b}$ is in the serial restriction group, and node $\underline{c}$, and node $\underline{e}$ are also in the serial restriction group, the former primary labels of node $\underline{c}$ and node $\underline{e}$ are saved as backup labels. Accordingly, label $L_2(\underline{c})=(5, \{a\underline{c}\})$, and the initialized values of label $L_1(\underline{e})$ and label $L_1(\underline{f})$ are stored as the label $L_2(\underline{e})$ and label $L_2(\underline{f})$, respectively. Further the restriction flags are set at each of nodes $\underline{c},\underline{e},\underline{f}$, to preclude the extension of the primary labels to another member of the serial restriction group.

The procedure iterates making node c permanent but because the restriction flag is set at node $\underline{c}$, the backup label for node $\underline{c}$ remains temporary, permitting the procedure to return to node $\underline{c}$, if and when the backup label identifies a least cost path called, herein a secondary path. Processing the primary label of node c involves updating labels of nodes d,e, f. The primary label of node d is updated as the cost of the path through node c is 3, which is less than the existing path ad with a cost of 4, i.e. label $L_1(d)=(3, \{abcd\})$. The path abcd is allowable because node d is not a member of the serial restriction group. Paths abce and abcf are not allowable by the subset intransitivity (and by the stronger subset sequence constraint) and accordingly neither of these labels are changed. Specifically, because the serial restriction flag set at node c, node e and node f are not updated.

In a next iteration, the label at node d is made permanent. The nodes c and f are the only nodes adjacent to node d that have labels in the priority queue. The backup label of node c, and the primary label of node f may be subsequently updated. The primary label of node f is changed to the label $L_1(f)=(4, \{abcdf\})$. Because node d is not in the serial restriction group, the primary label path is now extendible to a node in the group. Accordingly, the restriction flag at node f is unset, and the backup label at node f is reinitialized. The procedure will not update label $L_2(c)$ with the path abcdc if the subset sequence constraint is the stronger constraint, but will update label $L_2(c)$ if the subset sequence constraint is subset intransitivity. In this example, the subset sequence constraint is the stronger constraint, and accordingly the backup label of node c is not updated, specifically because node c is in the path of the label of node d.

It will be noted that if the subset sequence constraint is subset intransitivity, the resulting labels (in the order in which they are processed) are: $L_1(a)=(0, \{a\})$, $L_1(b)=(1, \{ab\})$, $L_1(c)=(2, \{abc\})$, $L_1(d)=(3, \{abcd\})$, $L_2(c)=(4, \{abcdc\})$, $L_1(f)=(4, \{abcdf\})$, $L_1(e)=(5, \{abcdce\})$, and $L_1(g)=(6, \{abcdfg\})$. When the procedure ends a backup label at node e (i.e. $L_2(e)=(7, \{abcdfge\})$) remains in the priority queue.

The labels in the priority queue are now as follows: $L_1(f)=(4, \{abcdf\})$, $L_2(c)=(5, \{abc\})$, $L_1(e)=(6, \{abe\})$, and initialized labels $L_2(e)$, $L_2(f)$, $L_1(g)$, and $L_2(g)$. Consequently the next label chosen is at node f. The backup label of node f is dropped because the restriction flag at node f is unset, and the label $L_1(f)$ is made permanent. The adjacencies of node f with impermanent labels are node e and node g. Accordingly the corresponding labels are updated as follows: $L_1(e)=(5, \{abcdfe\})$, and $L_1(g)=(6, \{abcdfg\})$. The restriction flag remains set at node e, and the (initialized) backup label of node e is unchanged. No restriction flag is defined for node g as node g is not in the serial restriction group.

The label $L_2(c)$ is next made permanent, but the only impermanent label of an adjacent node (e) already has a lower weight (5), and accordingly is not changed. Next the primary label of node e is made permanent but as the restriction flag is set at node e, label $L_2(e)$ is retained in the priority queue. The only label in the priority queue of a node adjacent to node e, is node g. When label $L_1(g)$ is updated, no change takes place because of an equal cost. Finally the label of node g is made permanent, label $L_2(e)$ is updated to label $L_2(e)=(7, \{abcdfg e\})$ and the procedure ends.

It should be noted that the procedure can end at an earlier time. Specifically when a path (corresponding to a route) between a predefined set of nodes (representing respective NEs) has been obtained, the procedure may end. An optimal path to a node is designated when the label is made permanent.

The second network 9 provides another exemplary graph 19 to which the illustrated method may be applied. The second graph 19 has two serial restriction groups, each associated with a respective subset sequence constraint. It will be noted that the two serial restriction groups are disjoint, and independently preclude allowance of respective paths. Starting again with a node a, the primary label of node a is made permanent, and the primary labels $L_1(b)=(1, \{ab\})$ and $L_1(c)=(3, \{ac\})$ are updated. Subsequently, label $L_1(b)$ is made permanent, its backup label is dropped, and label $L_1(d)$ is set to $(3, \{abd\})$. The restriction flag is set at node d, and its backup label is effectively reinitialized. The primary label at node c is not of a higher cost than a path through node b extended to node c via bc, and so label $L_1(c)$ is not changed. In a next iteration, the label at node c is made permanent, its backup label is removed from the priority queue, and primary labels of node f and node e are changed to $L_1(f)=(5, \{acf\})$, and $L_1(e)=(4, \{ace\})$, respectively. The restriction flag is set at node e. Neither label $L_1(d)$ nor label $L_2(d)$ is changed when node c is processed because node d has a lower cost primary label than that of the path through node c, and because the path through node c is not allowably extended, the secondary path to node d cannot be updated. In a next iteration the primary label at node d is made permanent, its initialized backup label is retained, and no adjacent label is updated because the restriction flag is set at node d., and the only impermanent label of an adjacent node is at node e, which is in the same serial restriction group as node d.

A next iteration makes the label at node e permanent. The backup label at node e is retained in the priority queue. The backup label at node d is not updated because aced is not allowable and the restriction flag is set at node e, and node f is not relabeled by the update because it already has a lower cost route than an extension of the path through node e. However, the primary label of the path to node g is set to $(5, \{aceg\})$. While the subset restriction flag is set at node e, and node g is in a serial restriction group, the path is still permitted because node e and node g are in different serial restriction groups (corresponding to subnetworks 14a and 14b, respectively). The primary label of node f is the next label made permanent, resulting in node h being updated, which receives a label $L_1(h)=(7, \{acfh\})$. The backup label of node e is also updated and changed from the initialized value to (8[acfe]).

In a subsequent iteration, the primary label of node g is made permanent, its backup label is dropped, and node i, and node j are relabeled as follows: $L_1(i)=(8, \{acegi\})$ $L_1(j)=(9, \{acegj\})$, and restriction flags are set at both of these nodes. Node h is also updated so that the restriction flag is set, and the labels are changed as follows: $L_1(h)=(6, \{acegh\})$, and $L_2(h)=(7, \{acfh\})$. Depending on whether the subset sequence constraint is the stronger constraint or subset intransitivity, label $L_2(e)$ is not updated, or is updated to $(6, \{acege\})$. In this example, the network is subject to the stronger subset sequence constraint.

At this juncture, the priority queue contains the following labels: $L_1(h)=(6, \{acegh\})$, $L_2(h)=(7, \{acfh\})$, $L_2(e)=(8, \{acfe\})$ [alternatively $(6, \{acege\})$, if merely subset intransitive], $L_1(i)=(8, \{acegi\})$, $L_1(j)=(9, \{acegj\})$ and backup labels of nodes d, i and j are initialized. In a next iteration, the primary label of node h is therefore made permanent, but no labels can be updated as all impermanently labeled nodes adjacent to node h are in the same serial restriction group as node h, and the restriction flag is set at node h. The backup label of node h is subsequently made permanent, and node h is processed again via a secondary path acfh. Subsequently the primary label of node j is updated as follows label $L_1(j)=(8, \{acfhj\})$, and the restriction flag remains set at node j because node h and node j are in the same serial restriction group. The primary label of node i is also updated but results in no change.

The backup label of node e is next to be made permanent (if the subset sequence constraint were subset intransitivity, the order in which labels $L_1(h)$, $L_2(h)$ and $L_2(e)$ are processed is different, but nothing else changes viz. primary labels). Label $L_2(\underline{d})$ cannot be updated as the path ac<u>fed</u> (or equally ac<u>eged</u>) is not allowably extended to a node in the serial restriction group. The primary label of node $\underline{i}$ is next made permanent: its initialized backup label is retained, and again no other label can be updated because of the restriction flag set at node $\underline{i}$. Lastly node $\underline{j}$ is made permanent, its still initialized backup label is also retained and the priority queue contains only backup labels for nodes $\underline{d}$, $\underline{i}$, and $\underline{j}$. The procedure therefore ends.

The invention has therefore been described in terms of two versions of a procedure and two examples of an application of the procedures. The procedures compute an optimal path from a root node to other nodes in a graph compensating for a subset sequence constraint, and therefore permits the identification of optimal allowable routes through a network represented by the graph.

The embodiments of the invention described above are intended to be exemplary only. The scope of the invention is therefore intended to be limited solely by the scope of the appended claims.

We claim:

1. A method for computing an optimal route between a first network element (NE) and other NEs of a network using a weighted graph of interconnected nodes that represent the network, the optimal route being subject to at least one subset sequence constraint, the method comprising:

defining a respective serial restriction group identifying nodes of the weighted graph that are subject to each subset sequence constraint, wherein the at least one subset sequence constraint includes a strong constraint in which a path cannot allowably extend through any two pairs of consecutive nodes in the serial restriction group;

creating a list of temporary labels respectively associated with the nodes of the graph, each node being assigned a primary label, and nodes in each serial restriction group being additionally associated with a backup label, the list initially comprising a most optimal primary label of a root node that represents the first NE;

examining the list of temporary labels to identify a most optimal label, and making the identified label permanent to remove it from the list;

selectively updating primary labels in the list for every node adjacent the permanently labeled node in order to ensure that the primary labels identify an optimal allowable path from the root node to the adjacent node; and repeating the examining and selectively updating until all primary labels of nodes representing the other NEs are permanent.

2. The method as claimed in claim 1 wherein selectively updating further comprises:

selectively updating backup labels in the list for every node adjacent the permanent labeled node in order to ensure that the backup labels identify an optimal allowable path from the root node to the adjacent node that is allowably extended to another node in a given serial restriction group.

3. The method as claimed in claim 2 wherein creating comprises initializing each of the temporary labels to include an optimization parameter that is least optimal, and an identifier of a null path.

4. The method as claimed in claim 3 wherein the initializing each of the temporary labels comprises assigning a cost, which is the optimization parameter, and wherein the examining the list comprises selecting a least cost temporary label.

5. The method as claimed in claim 3 wherein selectively updating the backup labels comprises ensuring that a backup label of the adjacent node is initialized unless the primary label path of the adjacent node cannot be allowably extended to a node in the serial restriction group, in accordance with the respective subset sequence constraint.

6. The method as claimed in claim 5 wherein selectively updating the backup labels further comprises setting a restriction flag at the adjacent node and saving a previous primary label as the backup label when the primary label is updated to identify a path that is not allowably extended to another node in the serial restriction group, and further comprising unsetting the restriction flag at the adjacent node and reinitializing the backup label of the adjacent node if the primary label of the adjacent node is subsequently updated to identify a path that is allowably extended to another node in the serial restriction group.

7. The method as claimed in claim 6 wherein selectively updating the primary label further comprises determining whether a path of the permanently labeled node extended to the adjacent node is allowable by the subset sequence constraint using at least one of: a rule for inclusion of members in the subgroup; and a list identifying allowable sequences of nodes.

8. The method as claimed in claim 7 wherein the subset sequence constraint includes subset intransitivity, and the determining whether the path is allowable comprises determining that the path of the permanently labeled node extended to the adjacent node is not allowable if the adjacent node is in the serial restriction group, and a restriction flag is set at the permanently labeled node.

9. The method as claimed in claim 8 wherein the subset sequence constraint includes a subset seriality restriction which precludes paths that include two links between three nodes in the serial restriction group, and wherein the determining whether the path is allowable further comprises determining that a path of permanently labeled node extended to the adjacent node is not allowable if the adjacent node is in the path of permanently labeled node.

10. The method as claimed in claim 7 wherein:

the allowable paths are subjected to a plurality of subset sequence constraints, associated with respective disjoint serial restriction groups;

initializing further comprises indicating each node's membership in a serial restriction group by assigning a one of a plurality restriction flags uniquely associated with respective serial restriction groups; and determining whether the path is allowable further comprises determining whether any of the subset sequence constraints precludes the inclusion of members in the corresponding serial restriction groups.

11. A method for deriving an optimal route from a first network element (NE) in a network to other NEs in the network, wherein the route is subject to at least one subset sequence constraint, the method comprising:

obtaining a weighted graph representing the network, the graph comprising nodes representing NEs in the network, a subset of the nodes being identified as members of a respective serial restriction group identifying nodes of the weighted graph that are subject to each subset sequence constraint, wherein the at least one subset sequence constraint includes a strong constraint in which a path cannot allowably extend through any two pairs of consecutive nodes in the serial restriction group; and constructing a spanning tree over the graph rooted at a root node which represents the first NE by:

iteratively expanding the tree to include a node to which a path from the root node is allowable in accordance with the subset sequence constraint, and is most optimal among the paths to nodes outside of the tree; and
if the path to the node cannot be extended to a node in any serial restriction group, reincluding the node through a secondary path to the node that can be extended to a node in the serial restriction group, when the secondary path is most optimal among the paths to nodes outside of the tree.

12. The method as claimed in claim 11 wherein constructing the spanning tree further comprises:
   initializing a set of primary labels, each associated with a respective node;
   for each serial restriction group, initializing a set of backup labels, each backup label being associated with a respective node in the serial restriction group; and
   setting an optimization parameter of the label of the root node to a most optimal value.

13. The method as claimed in claim 12 wherein:
   including a node in the tree comprises permanently labeling the node and updating temporary labels of nodes adjacent to the permanently labeled node; and
   iteratively expanding further comprises choosing the node that is most optimal from among the temporary labels.

14. The method as claimed in claim 13 wherein:
   updating temporary labels comprises:
      ensuring that a primary label of the node identifies an optimal allowable path from the root node to the labeled node; and
      if the identified path to the node is not allowably extended to a node in any given serial restriction group, ensuring that a backup label of the node identifies an optimal allowable path from the root node to the labeled node that is allowably extended to a node in the serial restriction group; and
   re-including a node comprises making permanent a backup temporary label.

15. The method as claimed in claim 14 further comprising:
   determining whether a path of a permanent label extended to a node is allowable by the subset sequence constraint using at least one of a rule, and a list identifying allowable sequences of nodes;
   not updating a temporary label of the node if the path is not allowable; and
   setting a restriction flag at the node if the temporary label is a primary label that is changed because the path is allowable, but is not allowably extended to another node in the serial restriction group.

16. The method as claimed in claim 15 wherein the subset sequence constraint includes subset intransitivity, and the determining whether the path is allowable comprises determining that a path to a node n is not allowably extended to an adjacent node m in the serial restriction group, if the restriction flag is set at n.

17. The method as claimed in claim 16 wherein the subset sequence constraint includes a subset seriality restriction which precludes routes that follow two links between three NEs that correspond to nodes in the serial restriction group, and the determining whether the path is allowable further comprises determining that a path to a node n extended a node m is not allowable if m is in the path to n.

18. The method as claimed in claim 16 wherein a plurality of disjoint serial restriction groups are defined over nodes in the graph, and initializing further comprises indicating each node's membership in a serial restriction group by defining restriction flags uniquely associated with respective serial restriction groups.

19. A route selection processor configured to use a weighted graph representing a network of network elements (NEs) to identify an optimal route from a first network element (NE) of the network, to other NEs of the network, subject to at least one subset sequence constraint, the route selection processor configured to:
   define a respective serial restriction group identifying nodes of the weighted graph that are subject to each subset sequence constraint, wherein the at least one subset sequence constraint includes a strong constraint in which a path cannot allowably extend through any two pairs of consecutive nodes in the serial restriction group;
   construct a spanning tree over the graph rooted at a root node representing the first NE by:
      iteratively expanding the tree to include a node of the graph to which a path from the root node is allowable, in accordance with each subset sequence constraint, and is most optimal among the paths to nodes outside of the tree; and
      if the path to the node cannot be extended to a node in any serial restriction group that includes some of the nodes in the graph, re-including the node through a secondary path to the node that can be extended to a node in the serial restriction group, when the secondary path is most optimal among the paths to nodes outside of the tree.

20. A route selection processor as claimed in claim 19 wherein the at least one subset sequence constraint includes a subset intransitivity limitation on allowable paths, and a determination that a path to a node is not allowable is made by preventing a path from extending over three consecutive nodes in the serial restriction group.

21. A route selection processor as claimed in claim 20 wherein the at least one subset sequence constraint precludes routes that have two links between two of three NEs that are represented by nodes in the serial restriction group, and a determination that a path to a node is not allowably extended to an adjacent node is made by preventing the adjacent node from being labeled if it is included in the path.

* * * * *